Feb. 20, 1968     H. W. STIER     3,369,284

TOOL HOLDER ASSEMBLY

Filed May 4, 1967     2 Sheets-Sheet 1

INVENTOR
Henry W. Stier

INVENTOR
Henry W. Stier

United States Patent Office 3,369,284
Patented Feb. 20, 1968

3,369,284
TOOL HOLDER ASSEMBLY
Henry W. Stier, Dearborn Heights, Mich., assignor to Carmet Company, Pittsburgh, Pa., a corporation of New Jersey
Filed May 4, 1967, Ser. No. 636,062
9 Claims. (Cl. 29—96)

ABSTRACT OF THE DISCLOSURE

A tool holder assembly including an inverted generally L-shaped swing away clamp pivotable about the leg thereof within a recess in the tool body, the arm thereof having a grooved-out portion on the undersurface thereof, the grooved-out portion receiving a chip breaker in slidable engagement, the chip breaker being retained within the groove by means of a wire spring member secured to the leg, the spring member also retaining a cam member cooperating with the chip breaker for adjustment thereof with respect to the insert. The leg of said clamp is also provided with a projection cooperating with shoulder means or stop means within the recess to provide the limits of rotation of the swing away clamp.

Background of the invention

Tool holders presently are provided with inserts which have a plurality of cutting edges and upon the wearing out of one edge, the insert can be removed and another cutting edge put into proper position, or the insert can be replaced. Spaced in close proximity to this cutting edge and directly above it is a plate member having an inclined surface sloping up and away from the cutting edge, this plate member being a chip breaker. Provision must be made for clamping the chip breaker on the insert while permitting ease of removal during the process of changing the cutting edge or the insert itself. It is additionally desirable that the chip breaker be adjustable with respect to the cutting edge in order to properly position it to perform the chip breaking function.

It is accordingly an object of this invention to provide a new and improved tool holder assembly including a swing away clamp rotatable between two positions.

It is another object of this invention to provide a new and improved tool holder assembly including a swing away clamp which retains a chip breaker in a readily adjustable and removable manner.

It is a further object of this invention to provide a new and improved tool holder assembly in which the chip breaker is supported within a groove on the undersurface of the arm of the swing away clamp.

It is still another object of this invention to provide a new and improved tool holder assembly in which the chip breaker is slidably retained within a groove of the swing away clamp.

It is a still further object of this invention to provide a new and improved tool holder assembly in which cam means cooperate with the chip breaker to provide adjustment of the chip breaker with respect to the cutting edge.

Summary of the invention

The above and foregoing objects of the invention are accomplished by providing a clamping member having an arm pivotally secured to the tool shank, the free end of the arm of the clamping member having a chip breaker inserted within a grooved-out portion in the underside thereof, cam means carried by said clamping member adjacent the rearward end of the chip breaker for adjusting the position thereof, spring means having one end thereof secured to the clamping member, the free end thereof cooperating with said cam means and said chip breaker for resiliently retaining the cam means and the chip breaker. The clamping member pivots within a recess in the tool shank, the recess being provided with shoulder means to limit the rotation of said clamping member.

Brief description of the drawings

Other objects, features and advantages of the invention will become apparent on the reading of the specification when taken in conjunction with the drawings in which.

Description of the preferred embodiments

Figure 1:
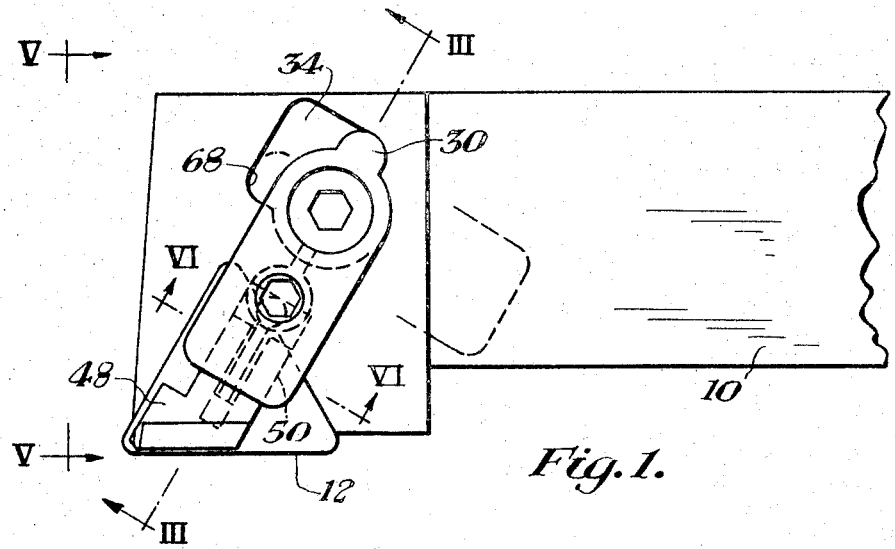
FIGURE 1 is a plan view of the tool holder assembly according to the invention.
Figure 2:
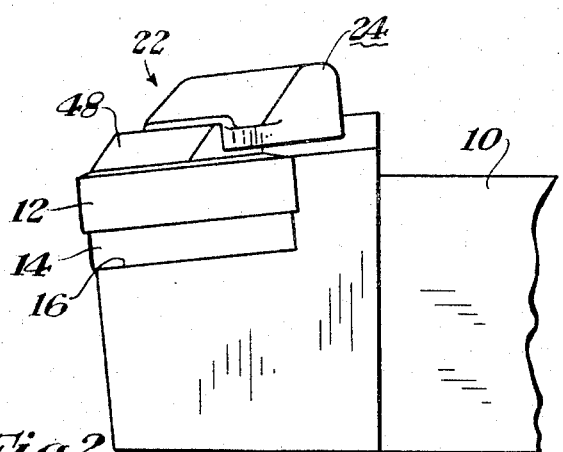
FIG. 2 is a side elevational view of the tool holder assembly of FIG. 1.
Figure 3:
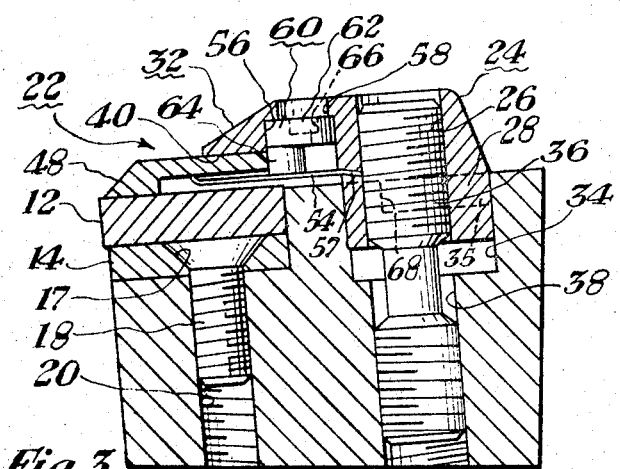
FIG. 3 is a cross-sectional view taken substantially along lines III—III of FIG. 1.
Figure 5:
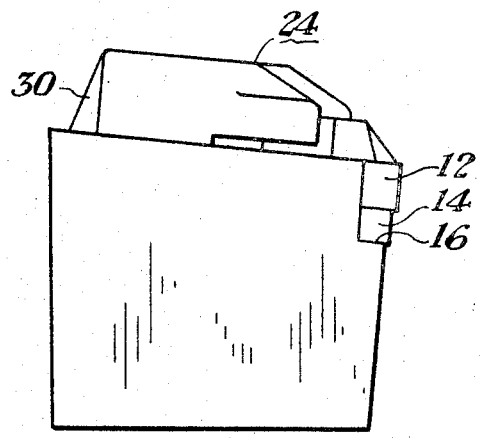
FIG. 5 is an end view as seen along lines V—V of FIG. 1.

Referring now to the drawings, there is shown in FIGS. 1 and 2 a tool holder assembly including a tool shank 10 having a triangular cutting insert 12 resting on a shim seat 14 in pocket 16 adjacent the free end of tool shank 10. As shown in FIG. 3, the shim seat 14 has an aperture 17 therein through which is inserted a screw 18, the screw 18 being counter sunk in the shim seat 14 to provide a planar upper surface, the screw 18 engaging the threaded aperture 20 and the tool shank 10. Insert 12 rests on shim seat 14 with the cutting edge of the insert 12 extending out over the edge of the shim 14. The insert 12 is secured by means of a clamping assembly generally designated 22.

Figure 4:
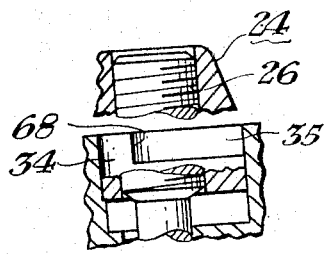
FIG. 4 is a partial view of FIG. 3 broken away to show details thereof.

The clamping assembly 22 (see FIGS. 3 and 4) includes a generally L-shaped clamping member 24 having a threaded aperture 26 extending through the leg 28 thereof. The leg 28 is generally circular in cross-sectional configuration and has a projecting portion 30 in general alignment with the arm 32 thereof for purposes which will hereinafter become obvious.

The leg 28 of clamping member 24 is inserted into a recess 34 in tool shank 10 and pivotally secured thereto by means of a double ended stud 36 having opposite ends thereof reverse-threaded through aperture 26 of leg 28 and through an axially aligned aperture 38 in the tool shank 10, the aperture 38 communicating with the recess 34. The double ended stud 36 provides rapid raising and lowering of clamping member 24.

Figure 6:
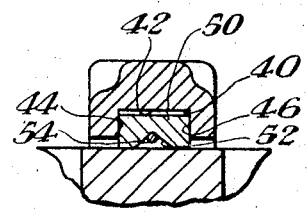
FIG. 6 is a partial cross-sectional view taken along lines VI—VI of FIG. 1.

The undersurface of the arm 32 is provided with a grooved-out portion 40 (see FIG. 6) having an upper wall 42 and depending side walls 44 and 46. A chip breaker 48 has a reduced portion 50 having generally parallel side walls for insertion into the groove 40 in slidable relationship. The lower surface of the reduced portion 50 of chip breaker 48 is provided with a female V-shaped groove 52. A wire spring member 54 has one end thereof inserted into a downwardly sloping aperture 57 located in leg 28 immediately adjacent the junction of leg 28 with arm 32 of clamping member 24. The free end of wire spring member 54 rides in the groove 52 of chip breaker 48 to resiliently urge the chip breaker upwardly to secure the reduced portion 50 within groove 40.

Disposed in the underside of arm 32 in the rearward portion of the groove 40 is located a circular cavity 56 and axially aligned therewith is an aperture 58 extending through the upper surface of arm 32 of clamping member 24. Positioned within the cavity 56 is a cam member 60 having a circular portion 62 and an offset reduced projection 64 extending into the groove 40 for contacting the rearward end of chip breaker 48. The projection 64 is generally ellipsoidal in cross-section with the outer surface thereof coinciding with a portion of the circumference of the circular portion 62 of cam member 60. An aperture 66 of polygonal cross-section is provided in the upper surface of cam member 62 in alignment with aperture 58 to permit insertion of a suitable wrench to provide rotation of the cam member 62 to thereby adjust chip breaker 48 with respect to insert 12.

During assembly of the clamping member 24, the cam member 60 is first positioned in cavity 56 with the projection 64 extending into the groove 40. The wire spring member 54 is then inserted into aperture 57 to thereby retain cam member 60 in place. Chip breaker 48 is then inserted into the groove 40 with the free end of wire spring member 54 disposed in the V-shaped groove 52 in the undersurface of the reduced portion 50 and chip breaker 48. Consequently, it can be seen that wire spring member 54 served to retain both cam member 60 and chip breaker 48 to the clamping member 24 with the clamping member thus assembled. The threaded stud member 36 is positioned in alignment between aperture 38 in tool shank 10 and aperture 26 in leg 28 of clamping member 24. Stud 36 is then rotated to draw clamping member 24 downwardly with leg 28 positioned in recess 34. With shim seat 14 and cutting insert 12 in place, the chip breaker is then urged downwardly by further tightening of stud 36. Prior to the completion of the tightening operation, cam member 60 can be rotated to adjust the outer edge position of chip breaker 48 with respect to insert 12.

During removal or replacement of insert 12, the stud 36 need be loosened only a small amount until the projection 30 of clamping member 24 clears the step 35 provided within recess 34 to permit clamping member 24 to partially remain in recess 34. The clamping member 24 can then be rotated counterclockwise as viewed in FIG. 1 to a position approximately 90° from its operative position (as indicated in dotted lines). The stud 36 is threaded for counterclockwise rotation whereby rotation of the stud rotates clamping member 24 when the step 35 of recess 34 is cleared. The limits of rotation are defined by the engagement of projection 30 of clamping member 24 with a shoulder 68 on recess 34. Clockwise rotation of stud 36 will then restore clamping member 24 to its operative position against the walls of recess 34. Thus, it can be seen that complete removal of the clamping member 24 is not necessary, and further the clamping member 24 can be quickly rotated to its original position and the chip breaker readjusted according to the new insert 12. Furthermore, definite limits of rotation are imposed for the insert-removing position by shoulder 68, and for the operative position by the walls of recess 34 inasmuch as the clamping member 24 is partially contained within recess 34 during removal of the insert.

Figure 7:
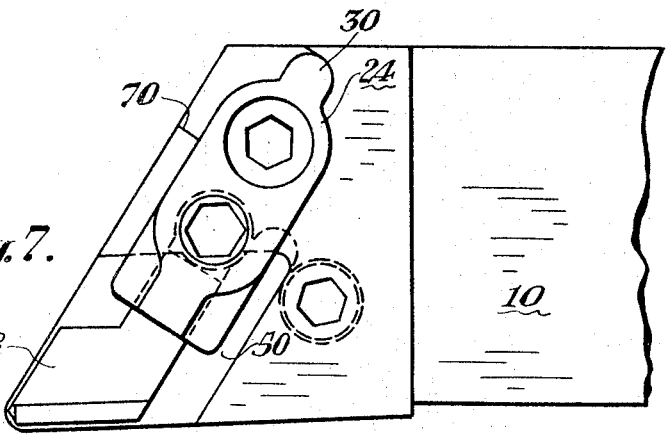
FIG. 7 shows a modified form of the tool holder assembly according to the invention in which an insert having a different configuration is used.
Figure 8:
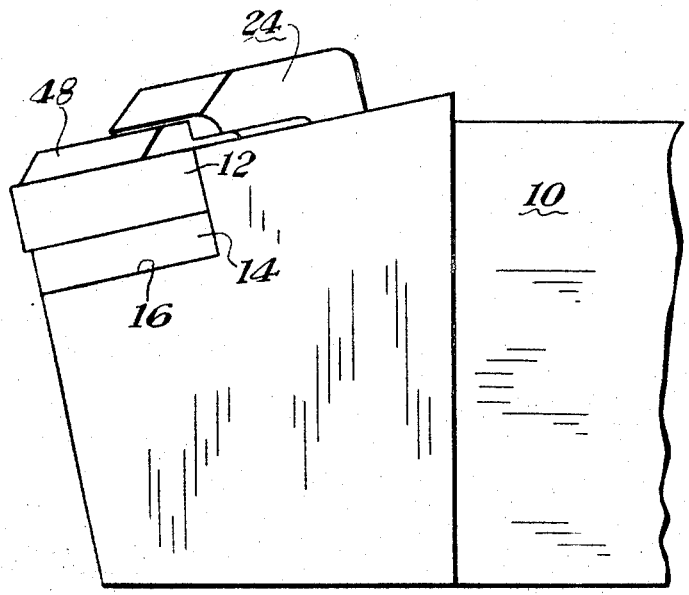
FIG. 8 shows a side elevational view of the tool holder assembly of FIG. 7.

FIGS. 7 and 8 show the clamping member 24 with its chip breaker 48 used in a tool holder having an insert 12 and a four-sided or parallelogram configuration. Operation and construction of the clamping assembly 22 is essentially similar to the embodiment of FIGS. 1 through 6 and further discussion thereof is deemed unnecessary, the various part numbers corresponding to those shown in the first six figures. During the removal of the insert 12, stud member 36 is rotated to permit counterclockwise rotation of the clamping member 24 until the projection 30 rests against stop or shoulder means 70.

While there have been shown and described preferred embodiments, it is to be understood that various other adaptations and modifications may be made without departing from the spirit and scope of the invention.

What is claimed is:
1. A tool holder comprising:

(a) a tool shank having a pocket adjacent one end thereof, said pocket being adapted for receiving at least one cutting tool;
(b) a recess in said tool shank adjacent said pocket;
(c) a clamping member having a first portion thereof insertable within said recess, said clamping member being pivotally secured by said first portion within said recess, said clamping member having a second portion in proximity to said pocket;
(d) a chip breaker slidably cooperating with said second portion, said chip breaker being adapted for engaging the upper surface of a cutting tool in said pocket;
(e) cam means carried by said clamping member for cooperating with said chip breaker to provide adjustment of said chip breaker with respect to the cutting tool; and
(f) biasing means carried by said clamping member for retaining said cam means and said chip breaker on said clamping member.

2. A tool holder according to claim 1 wherein said second portion of said clamping member is provided with a grooved-out portion on the undersurface thereof, said chip breaker having a reduced portion insertable in sliding engagement within said grooved-out portion.

3. A tool holder according to claim 1 wherein said clamping member has a projection adjacent its pivot point and said recess is provided with shoulder means whereby pivotal movement of said clamping member is limited from its operative position to the engagement of said projection with said shoulder means.

4. A tool holder according to claim 1 wherein said clamping member is generally L-shaped and said first portion is the leg thereof insertable within said recess, said leg having a threaded axial aperture extending therethrough, said tool shank having a reverse threaded aperture communicating with said recess in alignment with the aperture in said leg, a double ended reverse threaded stud engaging said aligned apertures for securing said clamping member to said tool shank.

5. A tool holder according to claim 1 wherein said biasing means is a wire spring member having one end thereof secured to the first portion of said clamping member and the free end thereof urging against said cam means and said chip breaker.

6. A tool holder according to claim 2 wherein the reduced portion of said chip breaker is provided with a groove on the undersurface thereof and said biasing means is a wire spring member having the free end thereof positioned within said groove.

7. A tool holder according to claim 4 wherein said recess is provided with a step portion and shoulder means adjacent said step portion, said step portion and said shoulder means being so configured that rotation of said stud raises said clamping member a predetermined distance until said leg clears the step portion and then rotates said clamping member until said clamping member abuts against said shoulder means whereby said clamping member and said chip breaker are displaced from the cutting tool to facilitate removal thereof.

8. A tool holder comprising:
(a) a tool shank having a pocket adjacent one end thereof, said pocket being adapted for receiving at least one cutting tool;
(b) a recess in said tool shank adjacent said pocket, said recess having a step portion and shoulder means adjacent to said step portion;
(c) a clamping member adapted for retaining a chip breaker engaging the cutting tool, said clamping member having a leg portion configured for insertion within said recess below said step portion, said clamping member having a projection adjacent said leg portion;
(d) means cooperating with said clamping member and said tool shank for operating said clamping member between a first and a second position, said first position having the leg portion of said clamping member within said recess below said step portion with the chip breaker secured against the cutting tool, and said second position having said leg portion at least partially within said recess above said step portion with said projection on said clamping member abutting against said shoulder means whereby removal of the cutting tool is facilitated.

9. A tool holder according to claim 8 wherein said means includes a threaded axial aperture extending through said leg, a reverse threaded aperture in said tool shank within said recess in alignment with the aperture in said leg, and a double ended reverse threaded stud engaging said aligned apertures.

References Cited
UNITED STATES PATENTS

| | | | |
|---|---|---|---|
| 2,848,789 | 8/1958 | Friedline | 29—96 |
| 2,982,008 | 5/1961 | Fackaitz | 29—96 |
| 3,171,188 | 3/1965 | Stier | 29—96 |
| 3,187,407 | 6/1965 | Ducet | 29—96 |
| 3,191,262 | 6/1965 | Gustafson | 29—96 |
| 3,193,909 | 7/1965 | Mihic | 29—96 |

HARRISON L. HINSON, *Primary Examiner.*